Feb. 19, 1935.          E. J. DILLMAN          1,992,155
CONTROL DEVICE
Filed Dec. 12, 1930
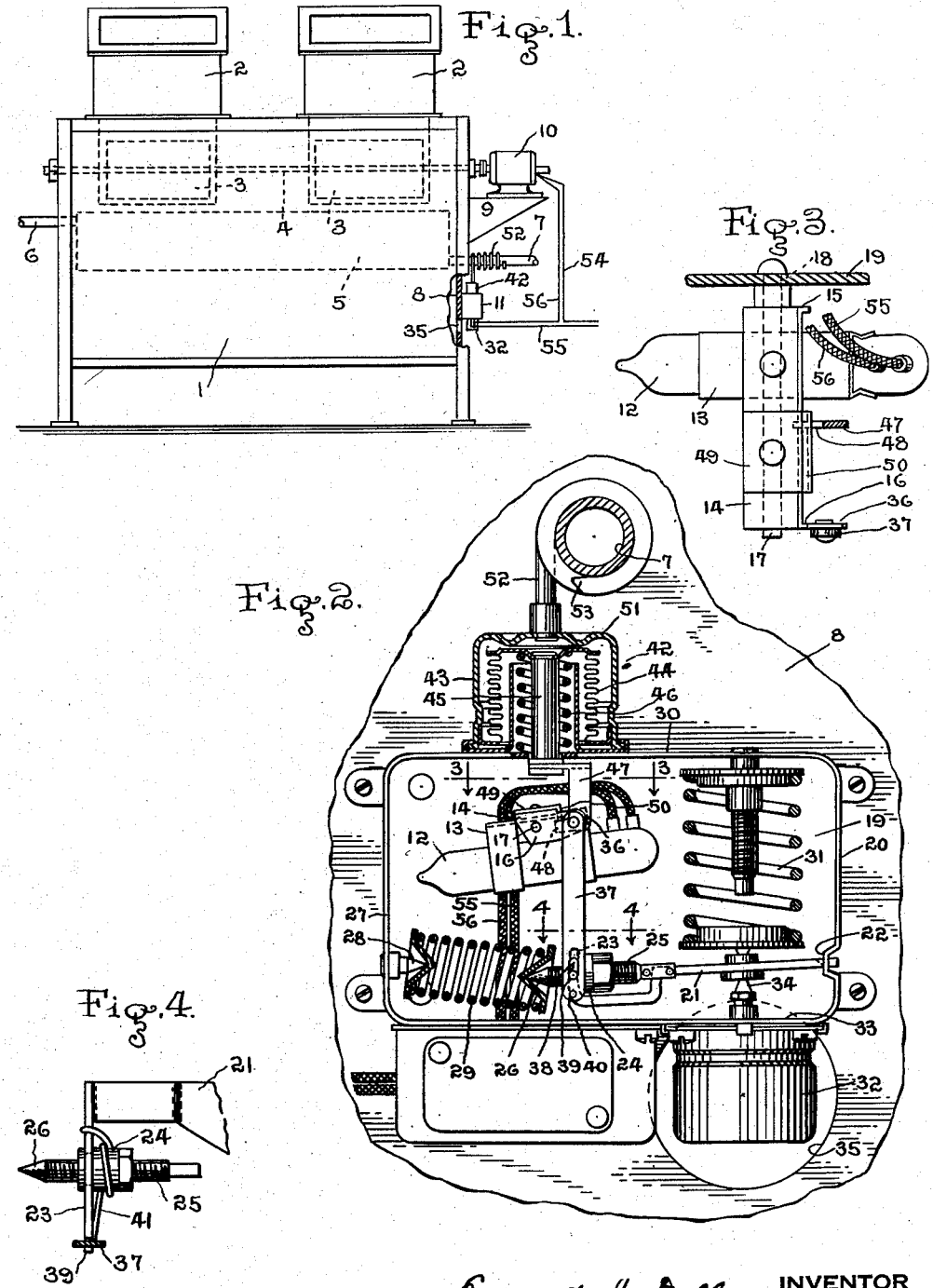
Earnest J. Dillman INVENTOR
BY ATTORNEY Patented Feb. 19, 1935

1,992,155

UNITED STATES PATENT OFFICE 1,992,155

CONTROL DEVICE

Earnest J. Dillman, Detroit, Mich., assignor to Detroit Lubricator Company, Detroit, Mich., a corporation of Michigan Application December 12, 1930, Serial No. 501,927

12 Claims. (Cl. 236—38)

My invention relates to new and useful improvements in control devices, and more particularly to a device for automatically controlling a motor means, such, for example, as the fan motor of a unit heater system.

An object of my invention is to provide a control means which is automatically movable between predetermined limits, and which has means operable thereon in response to a predetermined condition to maintain the control means at one limit of movement.

Another object is to provide a control means which is normally operable between limits by automatic means in response to predetermined conditions, and which has means operable in response to a predetermined condition to move the control means toward one of its limits irrespective of operation of the automatic means.

Another object is to provide a control means for a unit heater which is normally operable to control the unit heater fan means, and having means responsive to the unit heater temperature and operable on the control means to prevent control thereby of the fan means.

The invention consists in the improved construction and combination of parts, to be more fully described hereinafter, and the novelty of which will be particularly pointed out and distinctly claimed.

In the accompanying drawing, to be taken as a part of this specification, I have fully and clearly illustrated a preferred embodiment of my invention, in which drawing—

Figure 1 is a view in front elevation of a unit heater showing my control device applied thereto;

Fig. 2 is an enlarged detail view, partly in section, looking from right to left of Fig. 1 and showing the control device;

Fig. 3 is a detail view on the line 3—3 of Fig. 2, and

Fig. 4 is a detail view on the line 4—4 of Fig. 2.

Referring to the drawing by characters of reference, 1 designates generally the casing of a unit heater, preferably having its underside or bottom open to provide an inlet for circulation of air through the casing and having conduit or duct members 2 communicating with the interior of the casing and supported on the top casing wall to provide air outlets. Within the casing are air circulating means 3, preferably rotary fans of the squirrel cage type which draw air in through the open bottom of the casing and discharge the air through the members 2, and which are mounted on a drive shaft 4 journaled in the end or side walls of the casing. Also within the casing below the fan means is a heat transfer element 5 for varying the sensible heat of the air flowing through the casing, and which is preferably a heating means such as a radiator or the like having a conduit for conveying a heating medium such as steam thereto and condensate and steam therefrom. The conduit comprises an inlet pipe 6 and an outlet pipe 7, which pipes extend through the casing walls, preferably at the ends thereof, beneath the shaft 4. Fixed to the end wall 8 external of the casing, is a supporting bracket or member 9 on which is mounted a fan driving means 10, preferably an electric motor, which is connected to the end of shaft 4 which projects through wall 8. Secured to wall 8 external of the casing and below the element 5, is my control device 11 which controls the motor 10 and therefore the operation of the fan means 3.

The device 11 comprises a control means 12, preferably an electric switch of the mercury tube type, in which a globule of mercury enclosed in a sealed glass tube is operable to make and break contact, upon tilting or rocking of the tube, with terminals which extend into the tube. The means 12 is carried by a clip member 13 fixed to a carrier member 14 having downward extending end flanges 15, 16. Extending through the flanges 15, 16 is a pin or shaft 17 on which the means 12 is fulcrumed for rocking or tilting movement between predetermined limits. The shaft 17 is secured, as at 18, in the rear wall 19 of a casing or housing 20 which encloses the means 12. Within casing 20 is a vertically movable lever means 21 fulcrumed at one end in the end casing wall 22 and terminating at its free end beneath the shaft 17 in a substantially vertical, laterally extending portion 23 (Fig. 4) having a nut member 24 secured thereto and through which and the portion 23 is adjustably threaded a screw member 25 having a conical end 26. Projecting from the other casing end wall 27 is a supporting abutment 28 between which and the screw end 26 is a resilient means 29, preferably a coil spring, held under compression. Bearing at one end against the casing top wall 30 is a resilient means 31, preferably a coil spring, held under compression and bearing at its lower end against the top face of lever means 21. The spring means 29 and 31 which are adjustable, act conjointly to resist upward movement of the lever means and to determine the upward force required to lift the lever means 21 and serve on decrease of the lever lifting force to move the lever means 21 downward. The lifting force for the lever means 21 is provided by a power element 32 which is secured to the underside of the casing bottom wall 33 and which has a reciprocable plunger 34 extending upward through wall 33 into engagement with the underside of lever means 21 directly beneath the spring means 31. The element 32 preferably comprises a hermetically sealed bulb or container having a resilient wall to which the lower end of plunger 34 is connected, and containing a charge of volatile liquid, such that element 32 is a temperature responsive means or thermostat responsive to the temperature of the air outside of the casing 1. The element 32 and spring means 29, 31 comprise an automatic operating means for the switch tube 12. In line with the element 32 the heater casing end wall 8 is provided with an inlet aperture 35 so that the element 32 is directly responsive to the temperature of the air being drawn into the casing 1, which air has circulated through the space to be heated. The carrier member flange 16 has an operating arm 36 which extends substantially directly over and above the free end of lever portion 23. Pivoted to and depending from arm 36 is a link or rod member 37 having its lower end slotted, as at 38. The free end of portion 23 is reduced to provide a pin member 39 which extends into the slot 38. Below the slot 38 the link 37 has an aperture 40 which receives one end of a spring member 41 which is wound about nut member 24 and has its other end secured to lever portion 23 such that the spring member 41 normally tends to pull the link 37 downward and the upper end of slot 38 into engagement with pin 39. Mounted rigidly on the top wall 30 is a power element 42 comprising an hermetically sealed container 43 having a resilient wall 44 to which is secured a plunger 45 which extends downward through an aperture in the top wall 30 substantially over the shaft 17. Positioned between the resilient wall 44 and the casing wall 30 is a coil spring 46 which surrounds plunger 45 and normally tends to move the same upwardly and to maintain the same in a raised position. Secured rigidly on the free end of plunger 45 within the casing 20, is a holding means 47, preferably a hook member, which extends downward adjacent to and slightly below a side edge of the carrier member 14 to the rear of arm 36, and has a substantially horizontal arm 48 projecting beneath the carrier member 14 between arm 36 and means 12. The member 14 has secured thereto, between arm 36 and means 12, an angle plate member 49 with a depending flange 50 which cooperates with and is engageable by the hook arm 48. The top or end wall 51 of container 43 has secured thereto and opening therethrough, one end of a tube 52 which is sealed at its free end, as at 53, and which is wrapped or coiled about the outlet pipe 7 in heat conducting relation thereto. The tube 52 and container 43 are charged with a volatile liquid so that the element 42 and tube 52 comprise a temperature responsive means or thermostat. One terminal of the motor 10 preferably connects directly to an electric main or supply line by a lead 54, while the other lead 55 from the supply line connects to one terminal of the control means 12. The remaining terminal of the motor 10 and the other terminal of means 12 are connected together by a lead 56, so that the motor 10 is in series circuit with the control means 12.

The operation of my device as embodied in a unit heater system, is as follows: When the element 5 has been heated by steam or other heating medium supplied by pipe 6, the outlet pipe 7 will have its temperature raised. When the temperature of element 5 has been raised to a predetermined degree at which the temperature of the outlet pipe 7 will be at, say, about 160° F., then the volatile liquid in the coiled tube or bulb 52 will have expanded, exerting sufficient pressure to overcome the resistance of spring 46 and move the holding means 47 downward. As the hook arm 48 of means 47 is moved downward, the light spring 41 acting through link 37 will tilt or rock the control means or switch tube 12 clockwise of Fig. 2 on its fulcrum 17 to make contact between leads 55, 56 and start the fan motor 10. Downward movement of link 37 is permitted by the pin and slot connection between the link 37 and lever 21, and when arm 48 is completely depressed by the power means 42, the upper end of slot 38 will be in engagement with pin 39 and be so held by spring 41. Operation of motor 10 will drive fan means 3 to draw air from the space to be heated in through the bottom of casing 1, over or in contact with the heater element 5 and discharge the heated air through the ducts 2. The fan means 3 will also draw air into the casing 1 through the inlet aperture 35 which air will flow over the power means 32. When the temperature of the air passing over means 32 has been raised by the heated air discharged from ducts 2 to a predetermined degree— say, 70° F., then the pressure of the volatile liquid in means 32 will have built up sufficiently to overcome the resisting force of springs 29 and 31 and will move lever means 21 upward. As lever means 21 moves upward, the pin 39 which is in engagement with the upper end of slot 38 will lift the link 37 and tilt or rock the switch tube or control means 12 counterclockwise to the position of Fig. 2 to break the circuit of fan motor 10 and stop the further discharge thereby of heated air through ducts 2. Should the temperature of the air surrounding casing 1 now fall to, say 68° F., the pressure within means 32 will have decreased sufficiently to permit springs 29 and 31 to move lever means 21 downward, which movement will be transmitted to link 37 by spring 41 and tilt the switch tube 12 to make contact and again start the fan motor 10. If during the operation of the fan motor 10 the temperature of the heater element 5 decreases below the desired temperature so that the temperature of outlet pipe 7 becomes less than the predetermined temperature of 160° F., then the spring 46 will act upon reduction of pressure in container 43 and tube 52 to raise the hook member 47. As member 47 moves upward, arm 48 will engage flange 50 and tilt the switch tube 12 to the position of Fig. 2, thus breaking the fan motor circuit and will hold or maintain the means 12 in circuit breaking position, irrespective of operation of lever means 21. The upward force of spring 46 acting on means 47 to tilt the means 12 to circuit breaking position, need only be sufficient to overcome the light spring 41, as the springs 29 and 31 do not resist upward movement of means 47 by reason of the pin and slot, or lost motion connection between link 37 and lever means 21.

Although I have shown and described my control device as embodied in a unit heater system, it is to be noted that the same is capable of use in other systems wherein it is desired to control a motor means in response to variations of temperature or pressure, and to prevent operation of the motor means in response to a predetermined condition.

What I claim and desire to secure by Letters Patent of the United States is:

1. An apparatus of the character described, comprising a casing having means positioned therein to vary the sensible heat of the air flowing through said casing, fan means operable to cause air flow through said casing and in contact with said first-named means, means operable to control said fan means and responsive to the temperature of the air entering said casing, means opposing operation of said last-named means, and means responsive to the temperature of said means, said last-named responsive means acting on said opposing means and being operable to exert a force to overcome said opposing means whereby to permit operation of said control means.

2. An apparatus of the character described, comprising a casing having a main inlet and an outlet and having an inlet aperture in a side wall of said casing and spaced from said main inlet, said casing having means positioned therein to vary the sensible heat of the air flowing through said casing, fan means operable to cause air flow through said casing and in contact with said means, antomatic means operable to control said fan means and responsive to the temperature of the air entering said aperture, and means responsive to the temperature of said heat varying means to control the operation of said control means, said last-named responsive means including means engageable with and operable to hold said control means against operation by said automatic means until said heat varying means attains a predetermined temperature.

3. An apparatus of the character described, comprising a casing having a heating means therein, fan means operable to cause air flow through said casing and in contact with said heating means, means responsive to the temperature of the air surrounding said casing and subject to air flow entering said casing, a switch controlling operation of said fan means, an actuating member for transmitting motion from said responsive means to said switch, and means responsive to temperature of said heating means and controlling operation of said switch by said actuating member.

4. An apparatus of the character described, comprising a casing having a heating means therein, a conduit for conveying heating medium to and from said means, fan means operable to cause air flow through said casing and in contact with said heating means, means responsive to temperature of the air flow entering said casing to control said fan means, and means normally acting to prevent operation of said temperature responsive means, said last-named means responding to temperature of the heating medium in said conduit on the outlet side of said heating means to overcome said normally acting means thereby to permit control of said fan means by said first-named temperature responsive means.

5. An apparatus of the character described, comprising a casing having a heating means therein, fan means having a driving motor and operable to cause air flow through said casing and in contact with said heating means, switch means controlling the circuit of said motor, means responsive to the temperature of the air surrounding said casing and subject to air flow entering said casing and operatively connected to said switch means to make and break the motor circuit, and means engaging said switch means and normally acting to prevent operation thereof by said temperature responsive means, said last-named means responding to predetermined temperature of said heating means to release said switch means for operation by said temperature responsive means.

6. An apparatus of the character described, comprising a casing having a heating means therein, fan means having a driving motor and operable to cause air flow through said casing and in contact with said heating means, a control device having switch means positioned in the motor circuit and having a plurality of temperature responsive means, one of said responsive means being subject to temperature of the air flow entering said casing and acting on said switch means to control said motor, another of said responsive means normally acting to hold said switch means against operation by said one responsive means, said other responsive means acting upon predetermined temperature of said heating means to release said switch means for operation by said one responsive means.

7. An apparatus of the character described, comprising a casing having a heating means therein, fan means having a driving motor and operable to cause air flow through said casing and in contact with said heating means, a control device carried by said casing and having switch means positioned in the motor circuit and having a plurality of temperature responsive means, said casing having an aperture in line with one of said responsive means whereby air entering said casing through said aperture will contact said one responsive means, said one responsive means acting on said switch means to control said motor, another of said responsive means normally acting to hold said switch means against operation by said one responsive means, said other responsive means acting upon predetermined temperature of said heating means to release said switch means for operation by said one responsive means.

8. An apparatus of the character described, comprising a heat exchange element, fan means operable to cause air flow over said element, means responsive to temperature of the air circulated by said fan means, an electric switch controlling said fan means, means operatively connecting said responsive means and said switch, means opposing operation of said switch by said responsive means, and means responsive to temperature of said element to release said opposing means.

9. An apparatus of the character described, comprising a heat exchange element, a conduit for conveying heating medium to and from said element, a fan means operable to cause air flow over said element, a motor for driving said fan means, a switch controlling said motor, means responsive to temperature of the air circulated by said fan means and operatively connected to said switch, means normally resisting operation of said switch by said responsive means, means responsive to temperature of said conduit on the outlet side of said heating means, and means operable upon operation of said last-named responsive means to overcome said resisting means.

10. An apparatus of the character described, comprising a heat exchange element, a fan means for causing air flow over said element, a motor for driving said fan means, switch means controlling said motor, means responsive to temperature of the air circulated by said fan means, means interconnecting said responsive means and said switch means, spring means normally urging said switch means to circuit breaking position, said connecting means including a lost-motion connection whereby to permit operation of said switch means by said spring means, and means responsive to the temperature of said heat exchange element and operable to overcome said spring means whereby to permit operation of said switch means by said first-named responsive means.

11. An apparatus of the character described, comprising a casing having an inlet and an outlet and having an inlet aperture in a side wall thereof, a heat exchange element in said casing, a fan means operable to cause air flow through said casing and in contact with said element, a housing carried by said casing adjacent said aperture, switch means in said housing controlling said fan means, a temperature responsive element carried by said housing and positioned in the path of air flow through said aperture, means operatively connecting said temperature responsive element and said switch means, and means responsive to temperature of said heat exchange element operatively connected to said switch means whereby to control operation of said switch means by said temperature responsive element.

12. An apparatus of the character described, comprising a casing having an inlet and an outlet and having an inlet aperture in a side wall thereof, a heat exchange element in said casing, a fan means having a motor and operable to cause air flow through said casing and in contact with said heat exchange element, a housing secured to said casing adjacent said inlet aperture, switch means in said housing and controlling said motor, a temperature responsive element fixed to said housing and extending into the path of air flow through said inlet aperture, means normally opposing operation of said switch means, means responsive to temperature of said heat exchange element and operable to overcome said opposing means, and a lost-motion connection between said temperature responsive element and said switch means.

EARNEST J. DILLMAN.

CERTIFICATE OF CORRECTION.

Patent No. 1,992,155.  February 19, 1935.

EARNEST J. DILLMAN.

It is hereby certified that error appears in the printed specification of the above numbered patent requiring correction as follows: Page 3, first column, line 10, claim 1, after "said" insert the words heat varying; and same page, and column, line 63, for claim numeral "6" read 5.; and that the said Letters Patent should be read with these corrections therein that the same may conform to the record of the case in the Patent Office.

Signed and sealed this 16th day of July, A. D. 1935.

(Seal)

Leslie Frazer
Acting Commissioner of Patents.